United States Patent
Panas et al.

(10) Patent No.: US 12,209,817 B2
(45) Date of Patent: Jan. 28, 2025

(54) SYSTEM AND METHOD FOR THERMAL EMISSION CONTROL USING SEGMENTED ARRAY

(71) Applicants: Lawrence Livermore National Security, LLC, Livermore, CA (US); Bright Silicon Technologies, Inc., San Francisco, CA (US)

(72) Inventors: Robert Matthew Panas, Dublin, CA (US); Cynthia Dawn Walker Panas, Dublin, CA (US); Robert McHenry, San Francisco, CA (US)

(73) Assignees: Lawrence Livermore National Security, LLC, Livermore, CA (US); Bright Silicon Technologies, Inc., San Francisco, CA (US)

( * ) Notice: Subject to any disclaimer, the term of this patent is extended or adjusted under 35 U.S.C. 154(b) by 0 days.

(21) Appl. No.: 18/611,164

(22) Filed: Mar. 20, 2024

(65) Prior Publication Data
US 2024/0255241 A1 Aug. 1, 2024

Related U.S. Application Data

(62) Division of application No. 17/234,211, filed on Apr. 19, 2021, now Pat. No. 11,971,225.

(51) Int. Cl.
| | |
|---|---|
| *F28F 13/00* | (2006.01) |
| *B64G 1/50* | (2006.01) |
| *F15D 1/00* | (2006.01) |
| *F28F 13/02* | (2006.01) |
| *F28F 27/00* | (2006.01) |

(52) U.S. Cl.
CPC ............. *F28F 13/02* (2013.01); *B64G 1/503* (2013.01); *F15D 1/007* (2013.01); *F28F 27/00* (2013.01); *F28F 2280/105* (2013.01)

(58) Field of Classification Search
CPC .. B64G 1/50; B64G 1/503; F28F 13/00; F28F 27/00
See application file for complete search history.

(56) References Cited

U.S. PATENT DOCUMENTS

| | | |
|---|---|---|
| 6,511,021 B1 | 1/2003 | Keramidas |
| 6,538,796 B1 | 3/2003 | Swanson |
| 10,444,492 B2 | 10/2019 | Hopkins et al. |
| 10,700,779 B1 | 6/2020 | Panas |
| 11,030,148 B2 | 6/2021 | Panas |
| 2002/0056790 A1 | 5/2002 | Trimmer |
| 2017/0088294 A1 | 3/2017 | Willingham |

*Primary Examiner* — Eric S Ruppert
(74) *Attorney, Agent, or Firm* — HARNESS, DICKEY & PIERCE, P.L.C.

(57) ABSTRACT

The present disclosure relates to a method for controlling thermal radiation from a component. The method involves arranging a thermally conductive base layer in contact with the component, the base layer including a thermally emissive surface. A plurality of independently controlled shutter elements are movable about at least two orthogonal axes, and between closed and open positions, to change a dimension of a gap separating edges of adjacent ones of the shutter elements. The movements of the shutter elements are controlled about the two orthogonal axes to control the dimensions of the gaps to control thermal radiation emitted through the gaps.

20 Claims, 3 Drawing Sheets

SYSTEM AND METHOD FOR THERMAL EMISSION CONTROL USING SEGMENTED ARRAY

CROSS-REFERENCE TO RELATED APPLICATIONS

This application is a divisional of U.S. patent application Ser. No. 17/234,211 filed on Apr. 19, 2021 (now Allowed). The disclosure of the above application is incorporated herein by reference.

FEDERALLY SPONSORED RESEARCH OR DEVELOPMENT

This invention was made with Government support under Contract No. DE-AC52-07NA27344 awarded by the United States Department of Energy. The Government has certain rights in the invention.

FIELD

The present disclosure relates to systems and methods for thermal management, and more particularly to systems and methods for managing thermal emissivity of an object through the use of controlled movements of shutter elements of a segmented array.

BACKGROUND

The statements in this section merely provide background information related to the present disclosure and may not constitute prior art.

There has been significant interest in enabling a capability to modify emission profiles for a range of reasons. Heat dissipation is a constant concern for high performance equipment. This is a particularly important concern when aerospace equipment. Thermal behavior tends to be difficult to modify, while the environments in which the equipment operate may be highly dynamic. This often results in the unwanted situation where the thermal performance of the system must be designed for some overall average behavior, because the equipment simply cannot adapt in a manner needed to interact with the environment, and take into account the dynamical thermal environment that the equipment is operating in.

Among the dynamic solutions that have been developed that allow some level of modification, the dominant approach is the use of louvers. Louvers operate much like venetian blinds. Unfortunately, these systems are large, include several mechanical structures and bearings, and often end up thermally coupling through the mechanical linkages. This limits the louver thermal performance to only approximately a factor of 6 change in thermal impedance between open and closed states. Louvers also only provide a single limited direction of control, meaning the system may often end up closed and unable to dissipate heat while illuminated by the sun.

In view of the shortcomings of present day thermal management systems, a new thermal management system is needed that can reduce the size, weight and power of the present day louver design, while increasing the performance metrics-both of impedance amplitude change and of directionality.

SUMMARY

This section provides a general summary of the disclosure, and is not a comprehensive disclosure of its full scope or all of its features.

In one aspect the present disclosure relates to a method for controlling thermal radiation from a component. The method may comprise arranging a thermally conductive base layer in contact with the component, with the base layer including a thermally emissive surface. The method further may include using a plurality of independently controlled shutter elements, each being movable about at least two orthogonal axes, and between closed and open positions, to change a dimension of a gap separating edges of adjacent ones of the shutter elements. The method may further include controlling the movements of the shutter elements about the two orthogonal axes to control the dimensions of the gaps to control thermal radiation emitted through the gaps.

In another aspect the present disclosure relates to a method for controlling thermal radiation from a component. The method may comprise arranging a thermally conductive base layer in contact with the component, where the base layer includes a thermally emissive surface. The method may further include using a plurality of independently controlled shutter elements, movable about two non-parallel axes, and between closed and open positions, to change a dimension of a gap separating edges of adjacent ones of the shutter elements. The method may further include configuring a bottom surface of each one of the shutter elements, which face the base layer, to have an emissivity near 1 to help cool the shutter elements.

In still another aspect the present disclosure relates to a method for controlling thermal radiation from a component. The method may comprise arranging a thermally conductive base layer in contact with the component, where the base layer includes a thermally emissive surface. The method may further include using an electronic controller to control a plurality of actuation elements. The actuation elements may be controlled in a manner to control movement of a plurality of independently movable shutter elements disposed adjacent one another in a grid pattern. The method may further include controlling movement of the actuation elements in a manner to create gaps of controllably varying dimension therebetween, to control at least one of a magnitude of thermal radiation through the gaps or a direction of emission of the thermal radiation through the gaps. The method may further include causing the actuation elements to move the shutter elements in at least two of: a tilting motion about a first axis of rotation; a tipping motion about a second axis of rotation orthogonal to the first axis of rotation; a translating motion along a third axis, which is orthogonal to both the first and second axes of rotation, towards and away from the thermally emissive surface of the base layer; or a rotational movement about the third axis.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings in which.

DETAILED DESCRIPTION

Example embodiments will now be described more fully with reference to the accompanying drawings.

The present disclosure is related to systems and methods for dynamically controlling the radiative thermal emission profile from a surface, both in amplitude and in direction of emission, so that the surface thermal impedance can be changed by >10×, and so that the direction of emission of the low impedance flow can be dynamically controlled over a full 360° range.

The various embodiments described herein a thermal emission control system which in some embodiments makes use of a base layer having a high emissivity surface, and which is adapted to operate at high temperatures (e.g., 300 degrees C. or even higher). The system also includes a segmented array having a plurality of actuation elements and a plurality of shutter elements. The actuation elements are supported on the high emissivity surface of the base and support the shutter elements above the high emissivity surface. The shutter elements are movable, and their movements are controlled by the actuation elements. The high emissivity surface of the base dissipates heat, while the segmented array suppresses the surface's emissions unless the shutter elements are tilted to provide an enlarged gap through which high flux emissions can occur. In this manner the degree of opening of the shutter elements controls the degree of high flux emissions that can be released through the segmented array. The orientation of the shutter elements thus controls the overall thermal emissivity of the device, and may be further controlled to control a direction of the thermal emissivity from the base as well.

Figure 1:
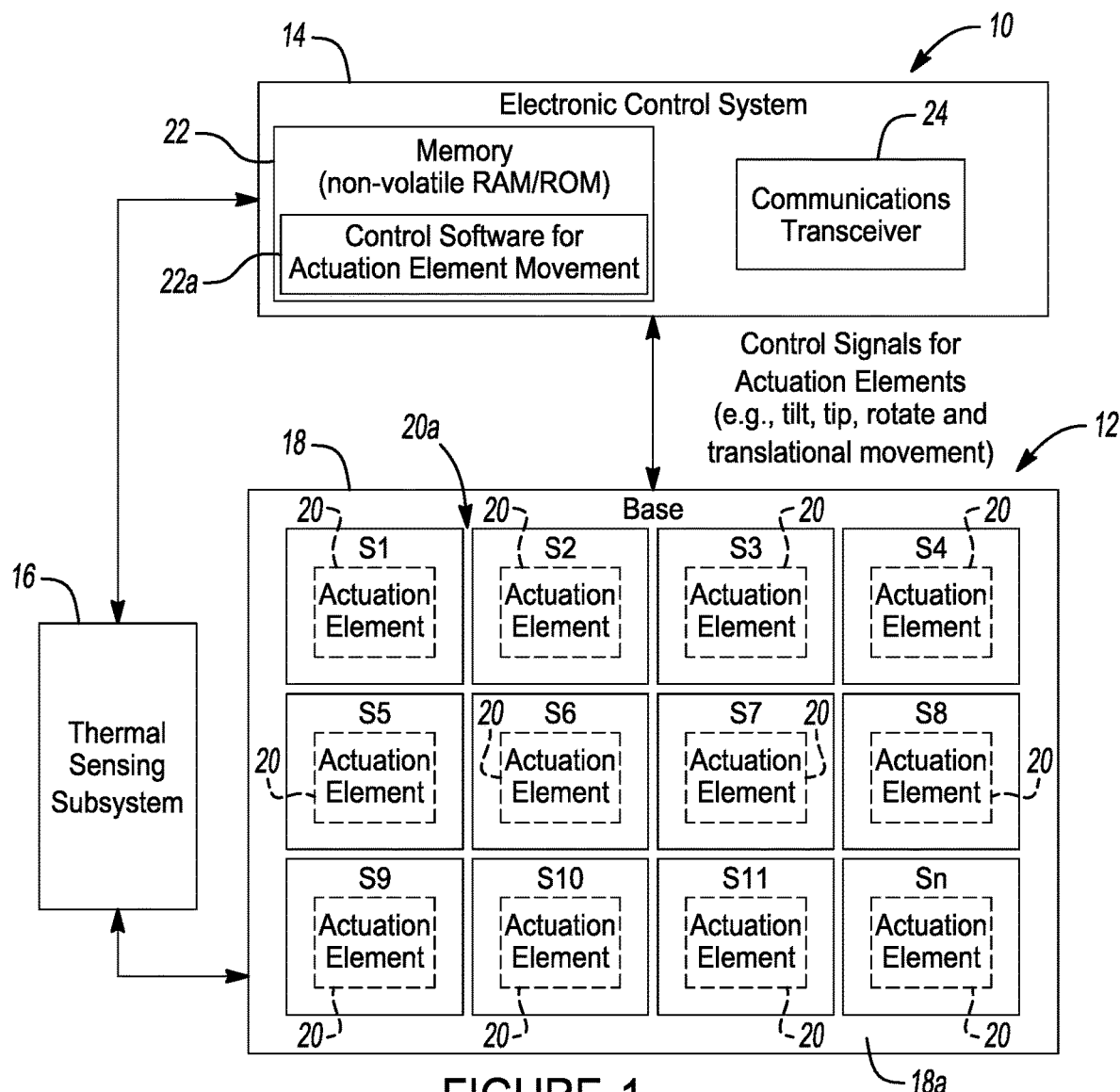
FIG. 1 is a high level block diagram of a system illustrating one embodiment for controlling thermal emissivity of an object, in accordance with the present disclosure.

Referring to FIG. 1 one embodiment of a thermal management system 10 is shown in accordance with the present disclosure. The system 10 includes a segmented array 12, and in some implementations an electronic control system 14 as well. An optional thermal sensing system 16 may be included which is in thermal communication with the segmented array 12 and electrical communication with the electronic control system 14.

The segmented array 12 includes a base layer 18 which may be made from any thermally conductive material, but in some preferred embodiments, and without limitation, is made of silicon or silicon carbide via microfabrication. The base layer 18 is able to function at a high temperature (e.g., up to 300° C. or even higher), and optionally may include a high emissivity layer or coating on a surface 18a to produce a high thermal radiative flux. The base layer 18 in one example supports a plurality of actuation elements 20, which in turn are coupled to a plurality of shutter elements S1-Sn. The actuation elements 20 may also be supported adjacent the base layer 18 on an independent component, rather than supported from the base layer itself, and the present disclosure therefore contemplates both types of assembly configurations.

In one embodiment a separate actuation element or set of actuation elements 20 is used for each shutter element S1-Sn, which enables maximum flexibility in tiling movement and translational movement of the shutter elements S1-Sn about all three of X, Y and Z axes. However, in other embodiments a single actuation element 20 could be used to activate two or more shutter elements, although such an arrangement would limit the range of motion of the shutter elements to one axis (i.e., either X or Y axes) of tilting movement and translational movement (i.e., up and down about the Z axis), as will become apparent from the following discussion. In this latter embodiment, for example, one actuation element 20 could be used to simultaneously control tilting or translation movement of an entire row or an entire column of shutter elements S1-Sn.

From FIG. 1, the shutter elements S1-Sn can be seen to be laid out in an X/Y grid pattern, with a small gap or spacing 20a (i.e., typically 5 µm-10 µm) between them. In the example of FIG. 1, the shutter elements S1-Sn have a hexagonal shape, although this is but one suitable shape, and other shapes (e.g., and without limitation, square, rectangular, octagonal, pentagonal, triangular, round, etc.) could be used. Preferably, whatever shape is selected will allow for a uniform repeating pattern of the shutter elements S1-Sn. Hexagonally shaped shutter elements S1-Sn are especially desirable as they readily enable tilting, tipping and translational movement, while still enabling the dimension of the gap 20a to be closely controlled and defined. The gap or spacing 20a between the shutter elements S1-Sn is also such to allow free tiling, tipping and translational movement of adjacently positioned shutter elements S1-Sn without interference with one another, while still forming a substantially solid surface, parallel to the surface 18a of the base layer 18, when the shutter elements are all in their closed positions. In their closed positions, the shutter elements S1-Sn form a flat plane arranged parallel to the base layer 18, and are able to suppress substantially all thermal radiation from the base layer 18. The controlled tiling, tipping, rotational or translational movement of the shutter elements S1-Sn effectively enlarges the gaps 20a between adjacent shutter elements S1-Sn, and these movements of the shutter elements can be used to effectively control the amplitude of thermal radiation that is radiated through the segmented array 12, while the controlled degree of tilting and tipping movements may be used to control the direction in which the thermal radiation is emitted, as will be described further in the following paragraphs. When in their fully opened orientations, the shutter elements S1-Sn enable maximum transmission of thermal radiation out through the gaps 20a. In most applications it is expected that the segmented array 12 may incorporate anywhere from just a few dozen shutter elements S1-Sn to possibly thousands or more of shutter elements S1-Sn, and the specific application will have a large bearing on the precise number of shutter elements needed.

With further reference to FIG. 1, the electronic control system 14, if included as part of the system 10, may include a non-volatile memory 22 (e.g., RAM/ROM, etc.), as well as a control software module 22a for assisting in generating commands for controlling movement of the shutter elements S1-Sn. A communications transceiver 24 (e.g., RS-232; parallel, wireless, analog wiring, etc.) may be used to communicate control signals to the actuation elements 20 to perform the needed tilting, tipping, rotational and/or translational (i.e., piston-like) movement. The control signals may be applied independently, in one embodiment in parallel simultaneously to all of the actuation elements 20. Optionally, a lesser plurality of control signals could be applied to control select groups of actuation elements 20, while still controlling all of the actuation elements as a single subsystem. In one embodiment the system 10 may be operated in a closed loop fashion with the electronic control system 14, for example using signals received from the thermal sensing subsystem 16 or any other external component as feedback signals, to help control movement of the shutter elements S1-Sn. Alternatively, the system 10 could be controlled in an open loop fashion. An open loop control scheme may involve a database stored in the memory 22 which contains one or more lookup tables for helping to determine the needed positioning signals for the shutter elements S1-Sn. The needed positioning signals may be based on information obtained from an on-board subsystem (i.e., carried by the electronic control system 14) or information obtained from an external subsystem in communication with the electronic control system (e.g., thermal sensing subsystem 16 or a remote subsystem in wired or wireless communication with the electronic control system 14. Still further, select ones of the shutter elements S1-Sn could be tiled, tipped, rotated or translated to open by differing amounts or degrees, and/or at different times, through either closed loop or open loop control schemes. As such, thermal radiation can be released in a highly controlled fashion from the base layer 18, for example from a fore to an aft location of the base layer, over a period of time.

Figure 2:
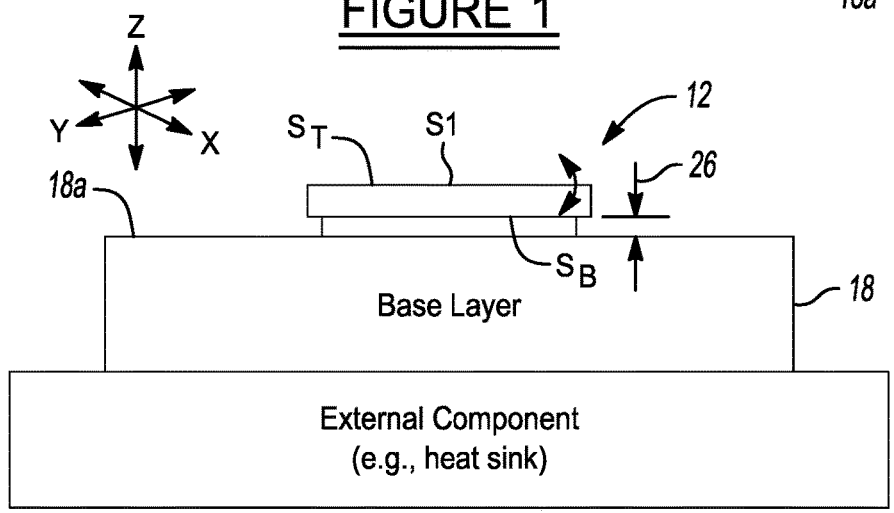
FIG. 2 is a highly simplified, enlarged side view block diagram of just one of the shutter elements shown in FIG. 1 being supported above the base by its associated actuation element.

FIG. 2 shows a highly simplified side view of a portion of the segmented array 12 illustrating how one of the shutter elements S1-Sn is supported above the surface 18a of the base layer 18 by a set distance, indicated by arrows 26. The distance defined by arrows 26 is selected to provide sufficient room for the actuation elements 20 on the base layer 18 to drive the shutter elements S1-Sn. This means there must be room for the shutter elements S1-Sn to rotate. In the case of designs using flexible linkages between the actuation elements 20 and the shutter elements S1-Sn, there must be sufficient space for linkages to be designed which can bend over the full desired range of motion. This tends towards designs of approximately 200 μm-500 μm spacing between the actuation elements 20 and the shutter elements S1-Sn. In this regard, tilting motion may be considered to be about one axis, for example the X axis, while tipping motion may be considered to be about the perpendicular Y axis. Translational movement of the shutter element S1 may be along the Z axis. Rotational motion of each of the shutter elements by the actuation elements 20 may also be about the Z axis (i.e., parallel to, towards and away from, the transmissive surface 18a. The size (i.e., surface area) of the shutter elements S1-Sn may vary considerably to meet the needs of a specific application, and the present disclosure is not limited to use with shutter elements S1-Sn of any specific diameter or surface area, but in most applications it is expected that shutter elements will perform well if formed with a general diameter of about 0.5 mm-2 mm, or a general surface area of about 1 mm².

The actuation elements 20 each form low thermal conductivity linkage subsystems that provide the ability to tilt, tip, rotate and translate their respective shutter elements S1-Sn. One construction suitable for forming the actuation elements 20 and the shutter elements S1-Sn is disclosed in U.S. Pat. No. 10,444,492 to Hopkins et al., assigned to the assignee of the present disclosure. The entire disclosure of U.S. Pat. No. 10,444,492 is hereby incorporated by reference into the present application. This patent describes a Lightfield Directing Array ("LDA") having a large plurality of independently controllable shutter/mirror elements that can be tilted, tipped and translated about three perpendicular axes. The applicability of this LDA to help form the segmented array 12 of the present disclosure will be discussed further in the following paragraphs.

Figure 3:
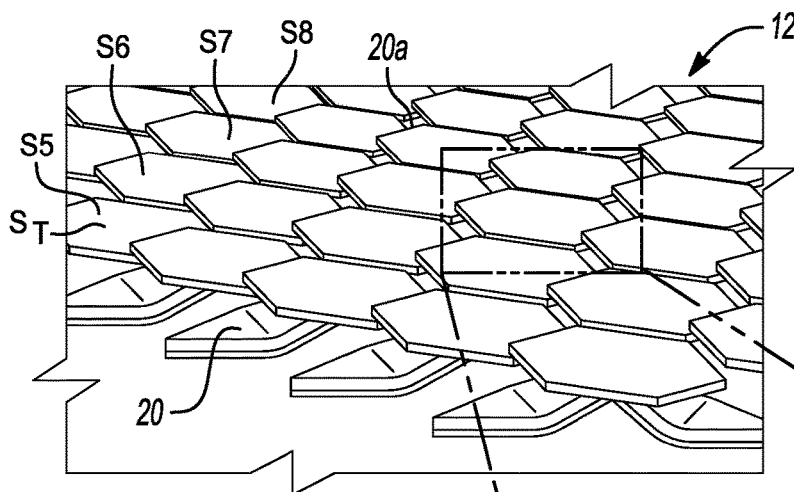
FIG. 3 is a high level perspective illustration on one example of how the shutter elements may be constructed having a hexagonal shape, are may be tilted to provide openings to emit thermal radiation from the base layer underneath.
Figure 4:
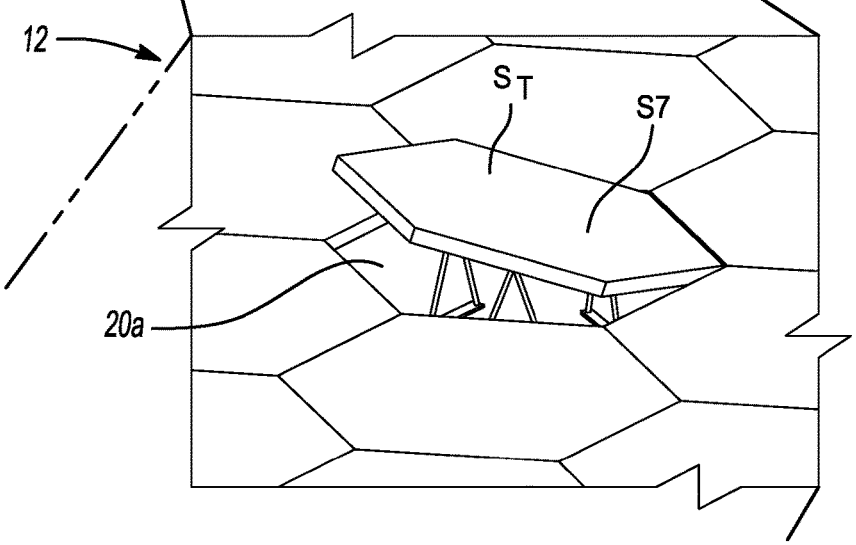
FIG. 4 is a highly enlarged view of just one of the shutter elements of FIG. 3 tilted into a partially open position.
Figure 5:
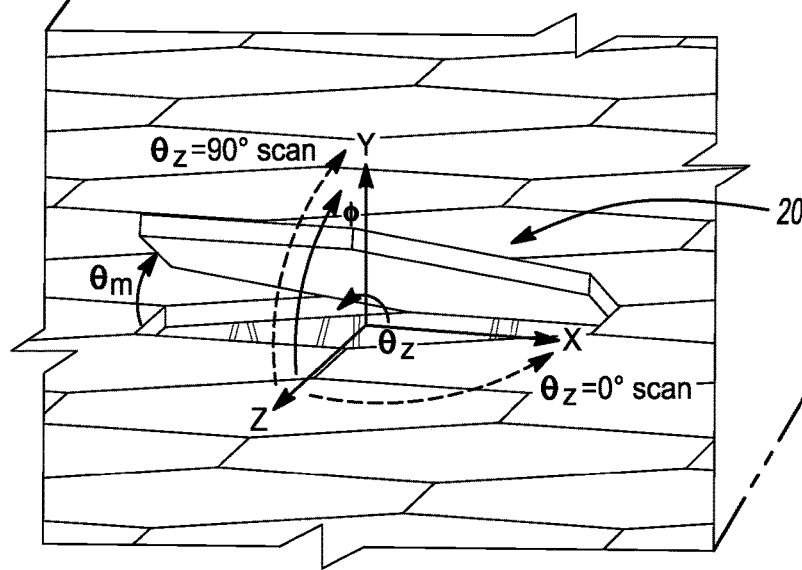
FIG. 5 is a highly enlarged illustration of a cross section of one of shutter element illustrating the different degrees of tilting and tipping motion which may be carried out.

FIGS. 3-5 show further examples of how the shutter elements S1-Sn may be controlled (i.e., FIGS. 3 and 4), as well as further illustrate the tipping and tiling motion that may be used to control each shutter element. The shutters S1-Sn in the segmented array 12 will suppress thermal radiation when in the fully closed position (i.e., completely flat). A command from the electronic controller 14 to the actuation elements 20 associated with the appropriate part of the base layer 18 will cause the desired shutter(s) to tip or tilt. The rotation causes a gap to appear in the surface of the segmented array, as visible in FIGS. 3 and 4, through which the base layer 18 can emit its thermal radiative flux. In one preferred implementation as mentioned above, the shutter elements S1-Sn have tip, tilt and piston motion control, so they can be raised (piston motion) and tilted by $\theta_m$ as shown in FIG. 5, thus providing a gap along a selected edge of each shutter element S1-Sn, while creating no gap on the other, opposite edge, the shutter element, as shown in FIG. 4. In one preferred embodiment each shutter element S1-Sn in the segmented array 12 can be independently controlled to open at a selected angle in both the tilt axis (e.g., about the X axis) and the tip axis (e.g., about the Z axis), or translated towards and away from the base layer 18 along the Y axis either with or without one or both of tilting and tipping motion. This enables both the amplitude and direction of the thermal emission to be closely controlled. The direction of propagation of the thermal emission is directionally controlled by choosing which way the shutters S1-Sn tilt. If all are tilted or tipped to full rotation in one orientation, then the hot base layer 18 is maximally allowed to emit in the controlled direction of tilt or tip.

Figure 6:
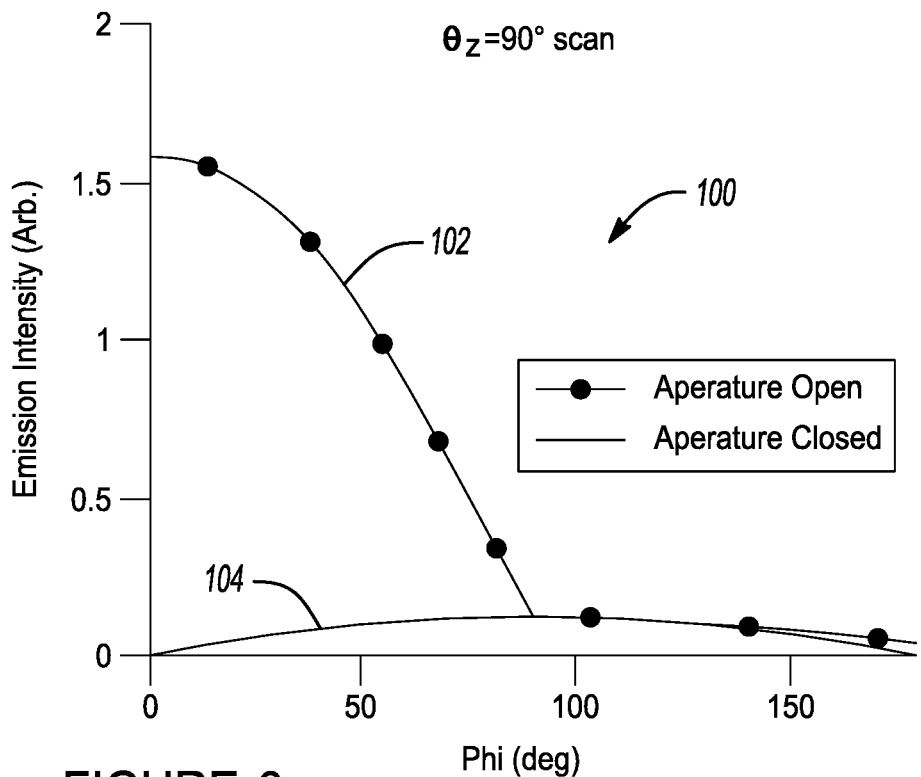
FIG. 6 is a graph showing two curves to illustrate emission intensity versus scan angle, with the segmented array having its shutter elements open and closed.
Figure 7:
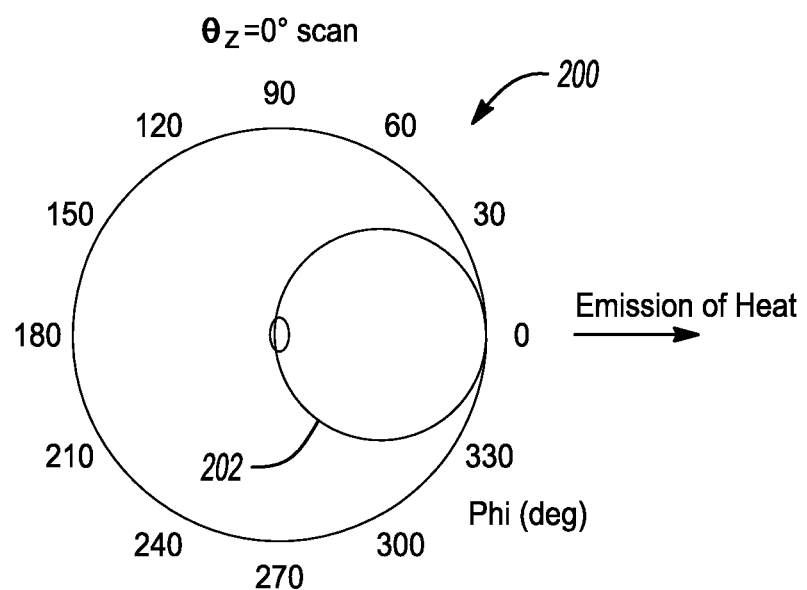
FIG. 7 is a plot showing an emissivity radiative pattern showing the radial emission of the open shutter in FIG. 5 when taken around the θz=0° line as indicated in FIG. 5. The emission is highest at φ=0° then drops off to near 0 when facing in the other direction. This shows that the shutter can direct the emissivity radiation pattern.

FIG. 6 shows a graph 100 illustrating thermal intensity profile curves with the shutter elements S1-Sn of the segmented array 12 fully open (curve 102) and fully closed (curve 104) at a 90° scan angle ($\theta_Z=90°$). The segmented array open curve 102 shows the emission profile along the plane defined by the $\theta_Z=90°$ line indicated in FIG. 5, when the shutter elements S1-Sn are fully open. The profile is showing maximum emissions at low φ angles, then the emissions drop off to 0 by φ=90° which corresponds to normal to the segmented array. This shows the emission profile is directed largely horizontally (along the X-Y plane) in FIG. 5. The segmented array closed curve 104 shows the emission profile along the plane defined by the $\theta_Z=90°$ line indicated in FIG. 5, when the shutter elements S1-Sn are fully closed. In this case, the shutter elements S1-Sn are blocking emissions from the base layer 18 below and the emission profile is dominated by the standard emission profile from the top of the shutter elements, which is much lower intensity than the open shutter profile 102. FIG. 7 shows a plot 200 where circle 202 indicates the radial emission of the open shutter element in FIG. 5 when taken around the $\theta_z=0°$ line as indicated in FIG. 5. The emission is highest at $\varphi=0°$ then drops off to near 0 when facing in the other direction. This shows that the shutter element can direct the emissivity radiation pattern.

The surface emissivity values for the various components of the segmented array 12 should be carefully engineered to maximize the effect of the thermal profile control. The base layer 18 upper surface 18a emissivity is preferably set near 1 to maximize its ability to transfer heat out of the segmented array 12. The bottom surface of the shutter elements S1-Sn (i.e., the surfaces represented by surface $S_B$ in FIG. 2 facing the base layer 18) may also have an emissivity near 1 to keep the shutter element temperature low. This creates a nearly black-body cavity between the base layer 18 and the shutter elements S1-Sn. When the shutters S1-Sn are opened, this black-body cavity is allowed to dump heat into the environment in a controlled direction defined by the gap 20a between adjacent shutter elements S1-Sn. The top surface $S_T$ of each of the shutter elements S1-Sn should have the lowest possible emissivity, so little flux passes through the shutter elements and out into the environment. The top (i.e., upper) surfaces $S_T$ of the shutter elements S1-Sn (shown in FIG. 2), which do not face the base layer 18) may have a mirror or mirror-like coating, which helps to prevent thermal radiation through the shutter elements to the base layer 18. The emissivity difference between the top surfaces of the shutter elements S1-Sn and the base layer 18 determines the scale of the possible thermal impedance change. High reflectivity upper surfaces on the shutter elements S1-Sn can provide very low emissivity, so aluminum or silver coatings could be used to provide values down to 0.02 for emissivity (see, e.g., "Silver-Based Low-Emissivity Coating Technology for Energy-Saving Window Applications"|IntechOpen). Further tradeoffs could be made based on separating the design requirements for the base layer 18 top surface 18a and shutter element S1-Sn top surface $S_T$ in FIG. 2. The base layer 18 top surface 18a should be optimized for thermal emission from the base layer, while the shutter element S1-Sn top surface $S_T$ could be engineered to manage incoming external radiation while minimizing emissivity in the IR regime. This engineering could be tuned to whether the goal is absorption or emission in specific wavelengths of external radiation. For instance, a highly reflective surface on the top of the shutter element S1-Sn would be ideal to reflect external solar radiation and would also provide a low emissivity surface, maximizing the thermal control of the segmented array 12. More complex coatings such as metamaterials or nanoparticles could be used to engineer a detailed spectrally dependent response for the shutter top surface to balance between external radiation requirements and minimizing thermal radiation emissivity as needed for the particular application.

The LDA, described in U.S. Pat. No. 10,444,492 mentioned above, is an example of a segmented array system which has the features and capabilities (base layer, shutter layer, segmented array, tip/tilt/piston control) needed to accomplish the thermal radiation magnitude and directional control of the segmented array 12. One preferred approach for the system 10 may be to use a LDA array adapted for high temperature operation (e.g., using all ceramic linkages in the actuation element 20), as the segmented array 12, and with the proper surface coatings as described above to maximize thermal emissivity performance.

An LDA-based thermal profile segmented array, such as the segmented array 12, has a number of advantages over conventional thermal modification structures like louvers. For one, the LDA approach is solid-state, containing no sliding bearings that could seize after use. Another advantage is that the LDA is a microscale surface structure, so the entire device could simply be bonded to the hot side of an external heat sink structure, without incurring significant size, weight or power penalties. Still another advantage is that the LDA is driven electrostatically which consumes very little power, adding little heat to the system. Still another advantage is that the LDA is manufactured from silicon (although even higher temperature materials are feasible), which means it has high thermal conductivity and can withstand high temperatures (>300° C.) without failure, which enables it to act as an effective uniform heat dissipation surface. Still another advantage is that microelectromechanical system (MEMS) devices like the LDA are compatible with microfabrication techniques, meaning they can easily be coated to correctly engineer the surface emissivity as described previously. Still another advantage is that the linkages between the base layer and the shutter layer in the LDA, which may form the actuation element 20, are vertical transmission elements which are ceramic and have extremely low thermal conductivity due to their scale and geometry. This means the shutter elements S1-Sn can be effectively suspended above the hot base layer 18 with only radiative heat transfer coupling, making them more efficient at controlling thermal impedance than the macro-scale louver approaches. Finally, the LDA tip/tilt/piston capability provides for the full 360° control of the thermal emission profile, in contrast to the limited unidirectional control provided by conventional louvers. From the above, the use of the LDA as the micro electromechanical to form the segmented array 12 provides a wide range of important benefits and advantages over present day louver-based thermal control systems.

If desired, the LDA-based approach also provides the ability to drive individual shutter elements S1-Sn in piston motion (i.e., translational motion along the Z axis) to allow for thermal emissions in all directions. However, this would likely be less effective than opening all the shutter elements S1-Sn of the segmented array 12 a particular direction via rotation, since if all the shutter elements were equally pistoned then the shutter surface would merely have been shifted upwards without opening. At best then, only around ½ of the elements could be opened in an array via purely piston translation.

The various embodiments described herein can be used for high performance equipment to control heat sink temperatures, to provide directional IR illumination, as an energy efficient way to selectively heat objects in 3D space, or to help dissipate energy in highly anisotropic environments as might be found by satellites in orbit. The various embodiments described herein provide a highly controllable and directable emission surface that can help ensure that waste heat is directed to the cold part of the environment, while orienting a custom designed surface towards the hot part of the environment. In one specific application, this allows satellites to continue to dissipate operationally generated heat even when the heat sink is illuminated by the sun, as would occur during part of each orbit. In this particular implementation of the system 10, the dynamic control provided by the segmented array 12 ensures that the surface emissions from the satellite will always point away from the sun, regardless of the satellite orientation. For land, sea, air, or space systems attempting to control their thermal signature, the shutter elements S1-Sn of the segmented array 12 can be fully closed to temporarily suppress thermal emissions. Alternatively, the segmented array 12 can be controlled so that emissions are directed away from likely threat vectors. Still further, the segmented array 12 can be controlled so that emissions can be randomly varied in different directions to minimize detection, identification, and/or tracking risk.

Other implementations of the various embodiments described herein may be with other forms of manned or unmanned space systems or vehicles (e.g., rovers). Other commercial implementations may be with dynamic directional room space heaters. Still further applications may be with land, sea and airborne systems where controlling a radiative thermal profile being emitted from one or more heat generating devices is important, and/or where selectively limiting the radiative thermal emission and the incoming thermal radiation from external heat sources during different times of the day, or during different stages of operation of the device, are important.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for controlling thermal radiation from a component, the method comprising:
    arranging a thermally conductive base layer in contact with the component, the base layer including a thermally emissive surface;
    using a plurality of independently controlled shutter elements, movable about at least two orthogonal axes, and between closed and open positions, to change a dimension of a gap separating edges of adjacent ones of the shutter elements; and
    controlling the movements of the shutter elements about the two orthogonal axes to control the dimensions of the gaps to control thermal radiation emitted through the gaps.

2. The method of claim 1, further comprising controlling the movements of the shutter elements to control a magnitude of the thermal radiation emitted through the gaps.

3. The method of claim 1, further comprising controlling the movements of the shutter elements to control a direction of emission of the thermal radiation emitted through the gaps.

4. The method of claim 1, further comprising actuation elements which are configured to position the shutter elements in an orientation such that the shutter elements form a substantially planar surface, minimizing a dimension of each of the gaps separating adjacent ones of the shutter elements, such that the segmented array substantially blocks all thermal radiation from the base layer when the shutter elements are in a closed position, and such that a dimension of the gaps is maximized when the shutter elements are in a fully open orientation, to enable maximum emission of thermal radiation through the gaps.

5. The method of claim 4, further comprising uniquely associating each one of the actuation elements with a single one of the shutter elements.

6. The method of claim 5, further comprising controlling the actuation elements independently of one another such that each one of the shutter elements is controlled independently in movement.

7. The method of claim 6, further comprising configuring the actuation elements to translate the shutter elements about an axis orthogonal to the thermally emissive surface of the base layer.

8. The method of claim 4, further comprising using the actuation elements to move the shutter elements in:
   a tilting motion about a first axis of rotation;
   a tipping motion about a second axis of rotation orthogonal to the first axis of rotation;
   a translating motion along a third axis, which is orthogonal to both the first and second axes of rotation, towards and away from the thermally emissive surface of the base layer; and
   a rotational movement about the third axis.

9. The method of claim 4, further comprising using an electronic control system for generating control signals to control movement of the actuation elements, and thus movement of the shutter elements.

10. The method of claim 9, further comprising causing the electronic control system to apply the control signals in parallel to the actuation elements.

11. The method of claim 10, further comprising uniquely associating each one of said actuation elements with a single one of the shutter elements, and using the electronic control system to control the actuation elements independently, in parallel, using the control signals.

12. The method of claim 1, further configuring at least one of the shutter elements with at least one of:
   a hexagonal shape;
   a rectangular shape;
   a square shape;
   an octagonal shape;
   a pentagonal shape;
   a triangular shape; or
   a round shape.

13. The method of claim 1, wherein:
   the thermally emissive surface is configured to have an emissivity of near 1 to maximize an ability of the base layer to transfer heat out of the component.

14. The method of claim 1, further comprising configuring a bottom surface of each one of the shutter elements, which face the base layer, to have an emissivity near 1 to help cool the shutter elements.

15. A method for controlling thermal radiation from a component, the method comprising:
   arranging a thermally conductive base layer in contact with the component, the base layer including a thermally emissive surface;
   using a plurality of independently controlled shutter elements, movable about two non-parallel axes, and between closed and open positions, to change a dimension of a gap separating edges of adjacent ones of the shutter elements; and
   configuring a bottom surface of each one of the shutter elements, which face the base layer, are constructed to have an emissivity near 1 to help cool the shutter elements.

16. The method of claim 15, further comprising configuring the thermally emissive surface with an emissivity of near 1 to maximize an ability of the base layer to transfer heat out of the component.

17. The method of claim 16, further comprising actuation elements, the actuation elements controlled to move the shutter elements in at least one of:
   a tilting motion about a first axis of rotation;
   a tipping motion about a second axis of rotation orthogonal to the first axis of rotation.

18. The method of claim 17, further comprising controlling the actuation elements to provide a translating motion towards and away from the thermally emissive surface of the base layer.

19. The method of claim 17, further comprising using an electronic controller to control the actuation elements.

20. A method for controlling thermal radiation from a component, the method comprising:
   arranging a thermally conductive base layer in contact with the component, the base layer including a thermally emissive surface;
   using an electronic controller to control a plurality of actuation elements;
   using the plurality of actuation elements to control movement of a plurality of independently movable shutter elements disposed adjacent one another in a grid pattern, and controlled in movement by the actuation elements to create gaps of controllably varying dimension therebetween, to control at least one of a magnitude of thermal radiation through the gaps or a direction of emission of the thermal radiation through the gaps;
   the actuation elements further being configured to move the shutter elements in at least two of:
   a tilting motion about a first axis of rotation;
   a tipping motion about a second axis of rotation orthogonal to the first axis of rotation;
   a translating motion along a third axis, which is orthogonal to both the first and second axes of rotation, towards and away from the thermally emissive surface of the base layer; or
   a rotational movement about the third axis.

* * * * *